T. B. KITSON.
FURNACE.
APPLICATION FILED DEC. 5, 1918.
1,343,457.
Patented June 15, 1920.
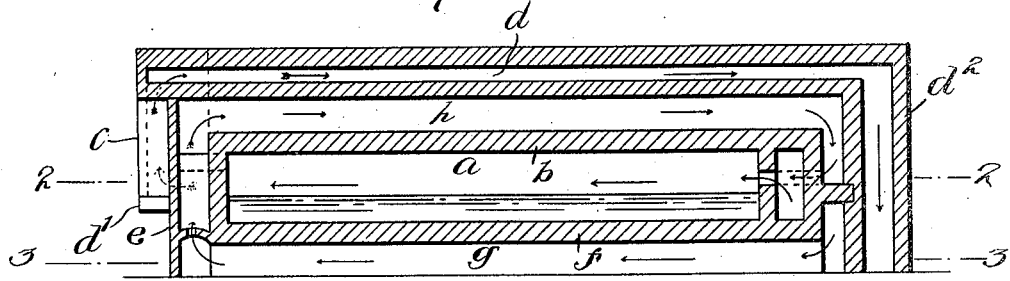
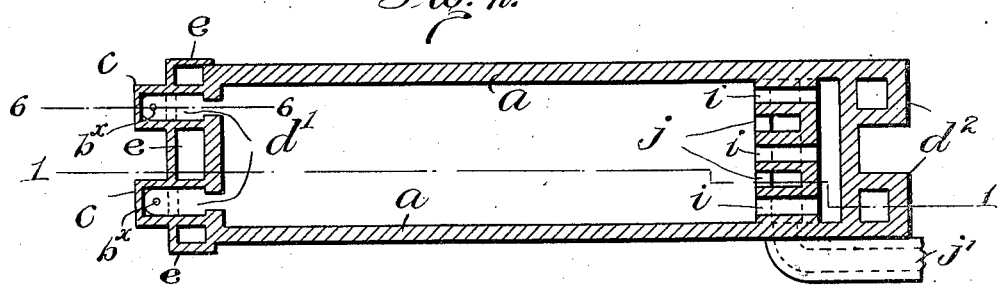
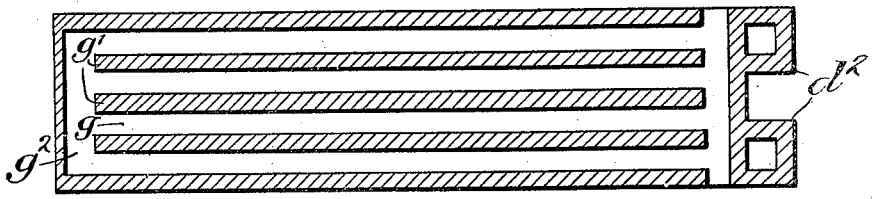
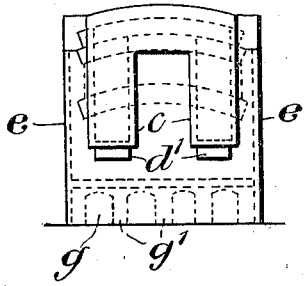
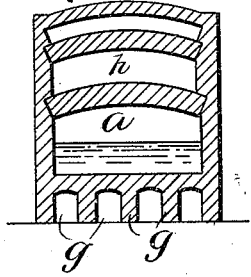
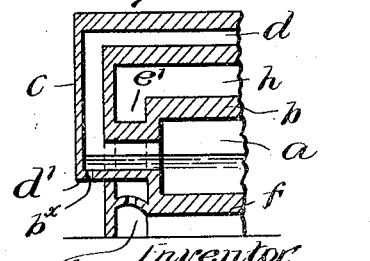
Inventor:
Thomas Binks Kitson
per C. Barnard Burdon
Attorney

UNITED STATES PATENT OFFICE.

THOMAS BINKS KITSON, OF LEEDS, ENGLAND.

FURNACE.

1,343,457. Specification of Letters Patent. Patented June 15, 1920.

Application filed December 5, 1918. Serial No. 265,352.

*To all whom it may concern:*

Be it known that I, THOMAS BINKS KITSON, a subject of the King of Great Britain, residing at 72 Albion street, Leeds, in the county of York, England, have invented certain new and useful Improvements in or Relating to Furnaces, of which the following is a specification.

This invention relates to furnaces in which the incoming air is heated on top of the furnace by the waste heat and gases.

According to the invention, the heating of the air-supply is effected in a flat chamber or flue between the furnace crown and a top flue for the waste gases. These gases are led from the furnace direct to the waste flue without passing through any regenerating or recuperating device. The said heating chamber or flue is free and unobstructed from end to end, so that it can be easily cleaned out, and it may be made of such a size that the air only travels slowly while inside it, and thus has time to become heated properly.

The furnace is also provided with an improved arrangement to prevent the glass becoming chilled or set accidentally at the discharge holes or troughs where it is withdrawn from the furnaces.

In the accompanying drawings:—

Figure 1 is a vertical longitudinal section of one construction of the improved furnace for use in glass manufacture.

Figs. 2 and 3 are horizontal sections thereof respectively on the lines 2—2, and 3—3, of Fig. 1.

Fig. 4 is an elevation of the left-hand part or "working head" of the furnace, viz., the part where the glass is withdrawn.

Fig. 5 is a part transverse section on the line 5—5 of Fig. 1.

Fig. 6 is a part vertical longitudinal section on the line 6—6 of Fig. 1.

$a$ is the body of the furnace, which is of oblong form, with a low roof or crown $b$. Its left-hand end or "working head" is provided with the waste-gas ports, outlets or uptakes $c$ leading to a waste flue $d$ at the top of the furnace, having at their bottom ends troughs $d^1$ for the out-flow of the glass at the holes $b^x$.

At the same end of the furnace, are provided short ports or uptakes $e$ for the air-supply which supports the combustion.

Any suitable known arrangements may be provided for regulating the rate of flow of the air and products of combustion, either in the flues or in the uptakes or ports. These flues are formed of parallel passages $g$ between a set of arches $g^1$ (Figs. 4 and 5) which support the furnace bed $f$. They open into the aforesaid short uptakes $e$ which lead to the intermediate heating chamber or flue $h$ along the top of the furnace.

The crown of the furnace $a$ forms the bottom of the intermediate flue $h$, while the roof or crown of the latter in its turn forms the bottom of the upper or waste-gas flue $d$. These crowns or roofs are arch shaped in transverse section as shown in Fig. 5.

The heating chamber $h$ is made much deeper than the waste flue $d$, so that it holds a large body of air which therefore flows more slowly through it, and has time to become properly heated.

The heated air passes back along this chamber $h$ toward the right or inlet end of the furnace, where it flows into the latter through suitable ports $i$ and at the same time mixes with the producer gas or other gas used for heating, which is supplied through a pipe or flue $j^1$ and enters the furnace through corresponding ports $j$.

The mixture which thus enters the body of the furnace, burns above the glass or metal in the bed of the furnace, at the same time passing along toward the working end. From this the products of combustion pass out through the short uptakes $c$ to the upper flue $d$, whence they flow back to the chimney, or rather to a down-flue $d^2$ leading to the latter. Thus the waste gases and the air to be heated flow through $d$ and $h$ respectively in the same direction.

Moreover the heating takes place practically without altering the direction of the air or waste gases in the flues $d$, $h$, and the ordinary arrangements of staggered or chequer-like brick-work such as used in certain types of furnace, are not required.

It will be readily understood that the flames and hot gases striking into the out-flow troughs or spouts $d^1$ at the bottom ends of the uptakes $c$ (see Fig. 6) impinge on the molten glass therein and act very efficiently to keep it in a properly liquid state.

Auxiliary gas inlets may if desired be provided along the sides of the furnace or in the working end to give increased local heating.

Moreover in a glass furnace, the glass can be "gathered" or taken out by hand along the sides of the furnace, while the discharge spouts $d^1$ $b^×$ are used to feed automatic bottle-making machinery at the working end by the flowing-out process.

In addition to this, dampers may be provided where required, for instance in the short uptakes, and by regulating these, the outflow of the products of combustion over the discharge spouts can be varied, and thus the temperature of the latter can be adjusted.

Although in the drawing, the roofs of the furnace and flues are shown straight and horizontal, yet if desired they may have a slight curvature or inclination downward toward the left.

Moreover the left-hand or "working" end of the furnace may be considerably enlarged and be of circular or T-shape so as to enable more outlets and outflow spouts $d^1$ $b^×$ to be provided, so that a greater number of machines can be supplied by the flowing-out process.

Obviously the invention can be modified in various ways in carrying the same into practice without departing from the general nature thereof.

I claim:—

1. In a furnace, the combination of parallel longitudinal passages superposed one on the other above the furnace roof, means for admitting waste gases from the outlet end of the furnace to the adjacent end of the upper passage, means for admitting air to the corresponding end of the lower passage, and means for admitting heated air and gas to the opposite end of the furnace, substantially as described.

2. In a furnace, the combination of a furnace body, a waste-products flue also extending from end to end above such furnace, an intermediate air-heating chamber between said furnace and flue, and ports at each end of the furnace for the air and waste products, said ports being so arranged that the air passes completely along the intermediate flue, in a direction opposite to that in which the gases travel in the furnace, substantially as described.

3. In a furnace the combination of a furnace body, an air-heating chamber extending longitudinally above said body, a waste flue overlying said chamber, outlet troughs for the discharge of the molten material at one end of the furnace, ports for the waste gases extending from said troughs up into the end of the waste flue, and air inlet ports at the same end of the furnace extending up into the air-heating chamber, substantially as described.

4. In a furnace the combination of a furnace body, an air-heating chamber overlying said furnace body, a waste flue overlying said heating chamber, ports connecting the outlet end of the furnace with the corresponding end of the waste flue, and ports at the opposite end of the furnace for connecting the corresponding end of the heating chamber with the body of the furnace so that the incoming air and the waste products both flow from end to end of the furnace in the same direction, substantially as described.

5. In a furnace, the combination of a furnace body, an unbaffled air-heating chamber overlying said furnace body, a waste flue overlying said chamber, end uptakes to conduct the waste products from the furnace body direct to the waste flue, an air-inlet passage beneath the furnace body, and air uptakes adjacent to those for the waste products extending from the inlet passage to the heating chamber, substantially as described.

6. The combination of a furnace body, an unbaffled air-heating chamber arranged horizontally above such body, an unbaffled waste flue arranged longitudinally above said chamber, an air inlet passage beneath said chamber, outlet troughs at one end of furnace body, uptakes for the air and said furnace body, uptakes for the waste products at the same end of the furnace, and inlets for the gas and heated air at the opposite end of said furnace body, substantially as described.

In testimony whereof I affix my signature in presence of two witnesses.

THOMAS BINKS KITSON.

Witnesses:
C. BARNARD BURDON,
T. J. OSMAN.